US012117914B2

(12) United States Patent
Kochura et al.

(10) Patent No.: US 12,117,914 B2
(45) Date of Patent: Oct. 15, 2024

(54) RUNTIME ENVIRONMENT DETERMINATION FOR SOFTWARE CONTAINERS

(71) Applicant: International Business Machines Corporation, Armonk, NY (US)

(72) Inventors: Nadiya Kochura, Bolton, MA (US); Tiberiu Suto, Franklin, NY (US); Erik Rueger, Ockenheim (DE); Nicolò Sgobba, Fasano (IT)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 16/935,921

(22) Filed: Jul. 22, 2020

(65) Prior Publication Data

US 2022/0027778 A1   Jan. 27, 2022

(51) Int. Cl.
*G06F 11/30* (2006.01)
*G06F 3/06* (2006.01)
(Continued)

(52) U.S. Cl.
CPC .......... *G06F 11/301* (2013.01); *G06F 3/0647* (2013.01); *G06F 8/60* (2013.01);
(Continued)

(58) Field of Classification Search
CPC .. G06F 2009/4557; G06F 8/60; G06F 3/0647; G06F 2206/1012;
(Continued)

(56) References Cited

U.S. PATENT DOCUMENTS 10,091,070 B2   10/2018  Chopra
10,191,778 B1   1/2019   Yang
(Continued)

FOREIGN PATENT DOCUMENTS

CN   105468362 A    4/2016
CN   105979009 A    9/2016
(Continued)

OTHER PUBLICATIONS

Majeed et al., "Performance Estimation of Container-Based Cloud-to-Fog Offloading" Sep. 11, 2019, arXiv: 1909.04945v1, pp. 1-6. (Year: 2019).*
(Continued)

*Primary Examiner* — Miranda M Huang
*Assistant Examiner* — Chase P. Hinckley
(74) *Attorney, Agent, or Firm* — Jared C. Chaney (57) ABSTRACT

Static parameters of a software container are identified that relate to metadata of the software container itself. The software container is assigned to a selected runtime environment based on the static parameters using a first machine learning model. Runtime parameters for the software container are identified by analyzing the software container at runtime. The runtime parameters relate to operations that the software container requires during runtime. Using a second machine learning model, it is determined whether the selected runtime environment matches the runtime parameters. Where the runtime environment matches, the software container continues to run in this environment. Where the runtime environment does not match, the software container is run in a different runtime environment that matches both the static and runtime parameters.

20 Claims, 5 Drawing Sheets

(51) Int. Cl.
*G06F 8/60* (2018.01)
*G06F 9/455* (2018.01)
*G06F 9/50* (2006.01)
*G06N 20/00* (2019.01)
*G06F 11/34* (2006.01)

(52) U.S. Cl.
CPC ............ *G06F 9/45533* (2013.01); *G06F 9/50* (2013.01); *G06N 20/00* (2019.01); *G06F 2009/4557* (2013.01); *G06F 11/3495* (2013.01); *G06F 2206/1012* (2013.01); *G06F 2206/1508* (2013.01)

(58) Field of Classification Search
CPC ......... G06F 2206/1508; G06F 9/45533; G06F 9/50; G06F 11/301; G06F 11/3495; G06N 20/00

See application file for complete search history.

(56) References Cited

U.S. PATENT DOCUMENTS

| | | | |
|---|---|---|---|
| 10,565,092 | B2 | 2/2020 | Benes |
| 10,601,679 | B2 | 3/2020 | Lynar |
| 11,132,293 | B2 * | 9/2021 | Shuster ................. G06F 16/122 |
| 11,372,689 | B1 * | 6/2022 | Allen .................... G06F 9/4887 |
| 11,537,809 | B2 * | 12/2022 | Gan .................. G06F 18/24147 |
| 11,769,035 | B1 * | 9/2023 | Wei .......................... G06N 3/04 706/15 |
| 2006/0230396 | A1 | 10/2006 | Martinez |
| 2015/0341428 | A1 * | 11/2015 | Chauhan ............. H04L 63/0209 709/203 |
| 2018/0136931 | A1 | 5/2018 | Hendrich |
| 2018/0246729 | A1 | 8/2018 | Kumar |
| 2018/0349168 | A1 | 12/2018 | Ahmed |
| 2019/0312800 | A1 | 10/2019 | Schibler |
| 2020/0117576 | A1 * | 4/2020 | Karukuri ............ G06F 11/3466 |
| 2021/0026614 | A1 * | 1/2021 | Manoharan ............... G06F 8/60 |
| 2021/0089361 | A1 * | 3/2021 | Rafey .................. G06F 9/45558 |
| 2021/0103499 | A1 * | 4/2021 | Alluboyina ............ G06F 3/067 |
| 2021/0255902 | A1 * | 8/2021 | Soon-Shiong ...... G06F 9/45558 |
| 2021/0397465 | A1 * | 12/2021 | Mellquist .............. G06F 9/5072 |
| 2022/0091900 | A1 * | 3/2022 | Ito .......................... G06F 9/5077 |
| 2023/0006988 | A1 * | 1/2023 | Menth ..................... H04L 63/20 |
| 2023/0008176 | A1 * | 1/2023 | Sedaghat .............. G06F 9/5038 |
| 2023/0115707 | A1 * | 4/2023 | Khan .................. G06F 9/45558 718/1 |

FOREIGN PATENT DOCUMENTS

| | | | |
|---|---|---|---|
| CN | 109376012 | A | 2/2019 |
| CN | 110309559 | A | 10/2019 |
| WO | 20150171030 | A1 | 11/2015 |

OTHER PUBLICATIONS

Mehta et al., "WattsApp: Power-Aware Container Scheduling" May 30, 2020, arXiv: 2006.00342v1, pp. 1-13. (Year: 2020).*
Soon-Shiong et al., "Cloud Computing Burst Instance Management" Feb. 19, 2020, U.S. Appl. No. 62/978,577. (Year: 2020).*
Ma et al., "Container Migration Mechanism for Load Balancing in Edge Network Under Power Internet of Things" Jul. 7, 2020, pp. 118405-118416. (Year: 2020).*
Fu et al., "Fast and Efficient Container Startup at the Edge via Dependency Scheduling" Jun. 2020, pp. 1-28. (Year: 2020).*
Wang et al., "KubeEdge.AI: AI Platform for Edge Devices" Jul. 7, 2020, arXiv: 2007.09227v1, pp. 1-2. (Year: 2020).*
Venkateswaran et Sarkar "Best-Fit Containerization as a Brokered Service" 2018, pp. 940-947. (Year: 2018).*
Smimite et Afdel, "Containers Placement and Migration on Cloud System" Jul. 16, 2020, arXiv: 2007.08695v1, pp. 9-18. (Year: 2020).*
Li et al., "Distributed Edge Computing Offloading Algorithm based on Deep Reinforcement Learning" May 19, 2020, pp. 85204-85215. (Year: 2020).*
Abdullah et al., "Burst-Aware Predictive Autoscaling for Containerized Microservices" May 2020, pp. 1-14. (Year: 2020).*
Khan et al., "An energy, performance efficient resource consolidation scheme for heterogeneous cloud datacenters" Nov. 23, 2019, pp. 1-23. (Year: 2019).*
Garcia et al., "A Cloud-Based Framework for Machine Learning Workloads and Applications" Jan. 30, 2020, IEEE, pp. 18681-18692. (Year: 2020).*
Chard et al., "DLHub: Model and Data Serving for Science" 2019, pp. 283-292. (Year: 2019).*
Peng et al., "DL2: A Deep Learning-driven Scheduler for Deep Learning Clusters" Sep. 13, 2019, pp. 1-15. (Year: 2019).*
Zhang et al., "MLModelCI: An Automatic Cloud Platform for Efficient MLaaS" Jun. 9, 2020, arXiv: 2006.05096v1, pp. 1-4. (Year: 2020 ).*
Fu et al., "Progress-based Container Scheduling for Short-lived Applications in a Kubernetes Cluster" Feb. 24, 2020, pp. 278-287. (Year: 2020).*
Li et al., "Pine: Optimizing Performance Isolation in Container Environments" Mar. 25, 2019, pp. 30410-30422. (Year: 2019).*
Bhattacharjee et al., "Barista: Efficient and Scalable Serverless Serving System for Deep Learning Prediction Services" Aug. 8, 2019, pp. 23-33. (Year: 2019).*
Xie et al., "A Service Mesh-Based Load Balancing and Task Scheduling System for Deep Learning Applications" Jul. 14, 2020, pp. 843-849. (Year: 2020).*
Thinakaran et al., "Kube-Knots: Resource Harvesting through Dynamic Container Orchestration in GPU-based Datacenters" Nov. 7, 2019, pp. 1-13. (Year: 2019).*
Yeh et al., "KubeShare: A Framework to Manage GPUs as First-Class and Shared Resources in Container Cloud" Jun. 2020, pp. 173-184. (Year: 2020).*
"Container Lifecycle Hooks," Kubernetes, May 30, 2020, 3 pages. <https://kubernetes.io/docs/concepts/containers/container-lifecycle-hooks/>.
"Docker overview," Docker Documentation, accessed Jul. 2, 2020, 7 pages. <https://docs.docker.com/get-started/overview/>.
Hu et al. "Concurrent container scheduling on heterogeneous clusters with multi-resource constraints," Future Generation Computer Systems 102 (2020), pp. 562-573.
Liu et al. "A new container scheduling algorithm based on multi-objective optimization," Soft Computing, vol. 22, Jul. 24, 2020, 12 pages.
Mell et al., "The NIST Definition of Cloud Computing," Recommendations of the National Institute of Standards and Technology, U.S. Department of Commerce, Special Publication 800-145, Sep. 2011, 7 pages.
Qiu et al. "A Deep Learning Approach for VM Workload Prediction in the Cloud," 2016 17th IEEE/ACIS International Conference on Software Engineering, Artificial Intelligence, Networking and Parallel/Distributed Computing (SNPD), May 30-Jun. 1, 2016, 6 pages.
International Search Report and Written Opinion dated Oct. 27, 2021, for International Application No. PCT /IB2021/056569, filed Jul. 21, 2021.

* cited by examiner

RUNTIME ENVIRONMENT DETERMINATION FOR SOFTWARE CONTAINERS

BACKGROUND

Part of developing systems that can run software includes configuring the system to provide a runtime environment in which the software will eventually run. The runtime environment should be defined to have all of the resources that will be required to run the application, and the runtime environment may also provide some basic functionality required for the application. For example, depending upon the software language and the application, the runtime environment may provide functionality such as garbage collection, managing the stack and heap, or the like. Further, the runtime environment may execute functionality such as load balancing, bin packing, self-healing actions, or the like.

SUMMARY

Aspects of the present disclosure relate to a method, system, and computer program product relating to determining requirements of runtime environments for software containers. For example, the method includes identifying static parameters of software container. The static parameters relate to metadata of the software container itself. The method further includes assigning the software container to a selected runtime environment based on the static parameters using a first machine learning model. The method further includes identifying runtime parameters for the software container. The runtime parameters are identified by analyzing the software container prior to runtime for the software container based on a second machine learning model. The runtime parameters relate to operations that the software container will require during runtime. The method further includes determining whether the selected runtime environment matches the runtime parameters, and either running the software container in the selected runtime environment when the selected runtime environment matches the runtime parameter or running the software container in a different runtime environment that matches both the static and runtime parameters when the selected runtime environment does not match the runtime parameters. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to assigning software containers to runtime environments, while more particular aspects of the present disclosure relate to setting up a first machine learning model to analyze static parameters of software containers and setting up a second machine learning model to analyze runtime parameters of software containers to determine runtime characteristics for software containers for purposes of assigning the software containers to runtime environments. While the present disclosure is not necessarily limited to such applications, various aspects of the disclosure may be appreciated through a discussion of various examples using this context.

In modern computer solutions, computing elements are becoming increasingly modular, such that various virtual and/or real components, modules, workloads, or the like may be migrated to different locations. For example, in modern cloud environments, there may be a great multitude of runtime environments that are available to run a great multitude of software containers for a great multitude of customers. Some or all runtime environments may have different varieties of resources available to them (e.g., different amounts of processing power, different amounts of memory, different input/output (IO) capabilities, etc.), and each software container may require a different combination of these resources to execute different functions within the runtime environment (e.g., different rates of load balancing, different number of rollbacks, different rate of automatic bin packing, different rates of self-healing, etc.).

If a software container is in a runtime environment that is more robust than is necessary (e.g., the software container only requires X number of load balancing actions per hour, and the runtime environment can provide 2X number of load balancing actions per hour), than some resources of the full computing system (whether within a single computer or across a network, such as a cloud computing network) may be wasted and/or underutilized. Similarly, if a software container is in a runtime environment that does not provide the resources required to run the software container at full capacity, then a performance of the software container may suffer. Modern systems may regularly migrate software containers between different runtime environments to try to avoid underutilizing resources and/or slowing down software containers during runtime due to inadequate resources of the runtime environment.

For example, conventional systems may utilize a process in which a trained operator guesses which runtime environment best fits a software container. For example, the trained operator may have assigned a plurality of software containers to a plurality of runtime environments, and may try to recall what worked previously for similar software containers, therein assigning the software container to such a runtime environment. The operator and/or the system may then monitor how the container performs in the environment, migrating the container incrementally over time to different environments until it appears that the needs of the software container are well matched to the capabilities of the runtime environment. However, this process is cumbersome and prone to user-error, and it may take a relatively long time before the software container is running in a runtime environment that is well matched for the software container.

Toward this end, a conventional system may try to use a machine learning model to match software containers and runtime environments. Such a machine learning model may try to find correlations between characteristics of the software container, needs of the software container within the runtime environment, and potential the runtime environments. However, there are a great number of factors that differentiate software containers, and further there are a great number of capabilities that differentiate runtime environments. As such, conventional systems that use a single machine learning model may have difficulty finding true correlations.

Aspects of this disclosure are geared toward reducing or eliminating these problems of conventional systems. For example, aspects of this disclosure relate to using a first machine learning model that analyzes static parameters of the software container to initially select a runtime environment and using a second machine learning model that analyzes runtime parameters of the software container at runtime to check if a software container should be migrated once running in the runtime environment. These two models may be independently updated based on performance of the software container in the initial (and any subsequent) runtime environment(s). By using two separate models in two different sets that handle discrete sets of variables, aspects of this disclosure may improve an ability of assigning a software container to a runtime environment that is well tailored for the software container in a relatively quicker time frame and with relatively few iterations (e.g., within a few hours of runtime, and within a first or second assignment to a given runtime environment rather than a fourth, fifth, sixth, etc. assignment).

Figure 1:
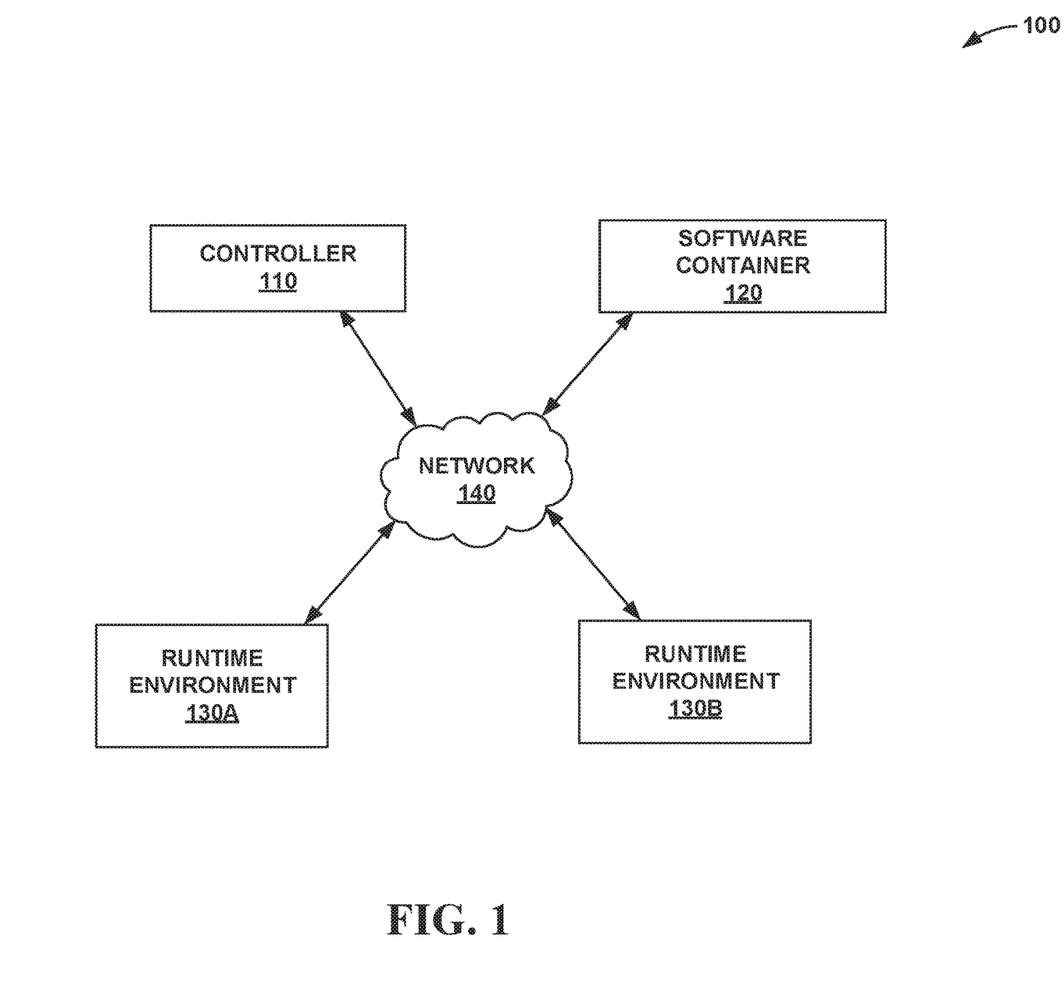
FIG. 1 depicts a conceptual diagram of an example system in which a controller may assign software containers to various runtime environments based on a plurality of machine learning models.

For example, FIG. 1 depicts environment 100 in which controller 110 assigns software container 120 to one of a plurality of runtime environments 130A, 130B (collectively, "runtime environments 130"). Controller 110 may include a computing device, such as computing system 200 of FIG. 2 that includes a processor communicatively coupled to a memory that includes instructions that, when executed by the processor, causes controller 110 to execute one or more operations described below.

Software container 120 may include a self-contained package that includes code and a set of dependencies. This code and set of dependencies may enable software container 120 to be run on a plurality of runtime environments 130 that match the software container as described herein. In some examples, software container 120 may be received from a remote computer device, though in other examples, software container 120 may be local to controller 110. Once running on one of runtime environments 130, software container 120 may be thusly accessed by one or more users. These users may be local or remote relative to one or each of controller 110, software container 120, and/or the respective assigned runtime environment 130.

Figure 2:
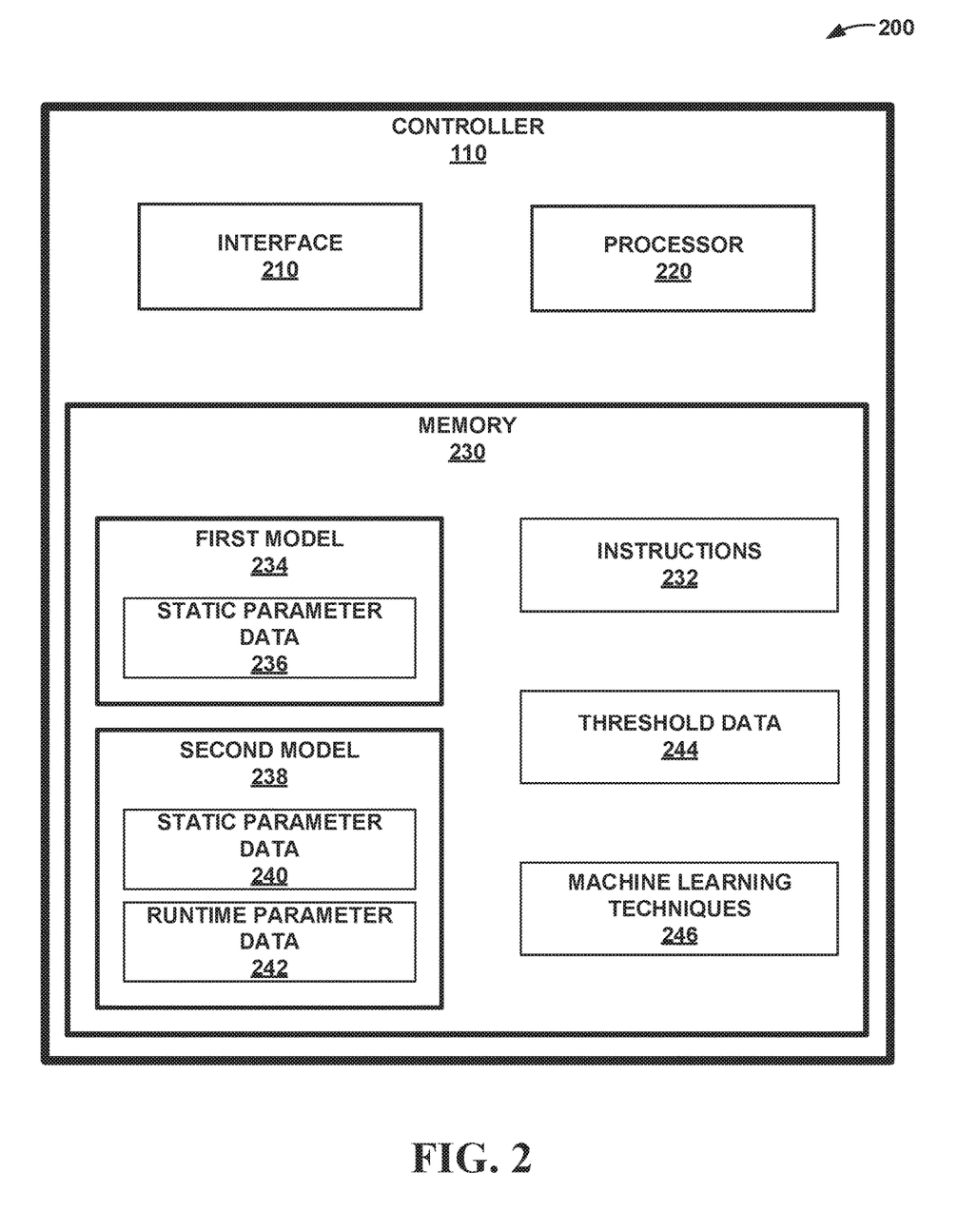
FIG. 2 depicts a conceptual box diagram of example components of the controller of FIG. 1.

Runtime environments 130 may be constructed environments within a computer system in which one or more software containers 120 may be run (e.g., such that an execution model of software container 120 is implemented by a respective runtime environment 130). For example, runtime environments 130 may relate to different nodes across a distributed system. Though only two runtime environments 130 are depicted in FIG. 1 for purposes of illustration, in other examples, controller 110 may have a substantial plurality of runtime environments 130 that each define different capabilities.

Runtime environments 130 may be provided (e.g., hosted) by one or more computing devices (e.g., computing devices similar to computing system 200 of FIG. 2). Such computing devices may be integrated into or discrete from a computing device that hosts controller 110 and/or provides software container 120. Such various computing devices of environment 100 may communicate over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device may receive messages and/or instructions from and/or through network 140 and forward the messages and/or instructions for storage or execution or the like to a respective memory or processor of the respective computing/processing device. Though network 140 is depicted as a single entity in FIG. 1 for purposes of illustration, in other examples network 140 may include a plurality of private and/or public networks over which controller 110 may manage connectivity as described herein.

Controller 110 may analyze static parameters of software container 120 to assign software container 120 to one of runtime environments 130. These static parameters may relate to metadata of the software container itself. In some examples, none of these initial static parameters may directly define requirements needed by software container 120 during runtime. Some of the static parameters may be substantially permanent in nature, such that it is unlikely or impossible that a static parameter of software container 120 would change over time.

For example, static parameters of software container 120 may include such variables as a date and time at which software container 120 was created, a date and/or time at which software container 120 was last accessed (e.g., accessed by a user, or accessed by a developer), a date and/or time at which software container 120 was last modified (e.g., such that code and/or dependencies of software container 120 has changed), a size (in bytes) of software container 120, a category or type of software container 120 (e.g., based on functionality of software container 120, a target audience of software container 120, whether software container 120 is a cloud based application, or the like), a template of software container 120, or other such variables.

Once controller 110 has identified these static parameters, controller 110 assigns software container 120 to one of runtime environments 130. Controller 110 may use a first machine learning model that determines correlations between these static parameters and runtime environments 130 to assign software container 120 to one of runtime environments 130. For example, controller 110 may determine that a size of software container 120 as created in the year in which software container 120 was created and not updated within the timeframe reflected by the static parameters matches runtime environment 130A. As such, controller 110 may assign software container 120 to runtime environment 130A, and execute such steps as are required to enable software container 120 to execute in runtime environment 130A (e.g., migrating software container 120 from a remote location unto a location at which software container 120 may run in runtime environment 130A).

Controller 110 may monitor software container 120 during runtime in the assigned runtime environment 130A. Controller 110 may monitor runtime parameters of software container 120. These runtime parameters may relate to operations that software container 120 requires during runtime. For example, as discussed above, runtime parameters may relate to a restart policy of software container 120, a number of load balancing actions per hour (e.g., including a number of times processing demand of software container 120 was higher than processing allotted by a host of software container 120, further considering and/or filtering out instances of maintenance, hardware failure, or the like), a number of automated rollbacks, a number of automatic bin packing actions, a number of self-healing actions, or the like.

Further, controller 110 may monitor for such parameters as an amount of access (reads) of software container 120 and/or a number of modify (write) actions of software container 120 since creation, a number of access and/or modify operations since software container 120 was reset, or the like.

Controller 110 may determine how well software container 120 matches with runtime environment 130A. Controller 110 may determine that software container 120 matches with runtime environment 130A based on a performance of software container 120 in runtime environment 130A. For example, controller 110 may monitor the usage of a central processing unit, memory usage, input/output usage, a number of times that software container 120 is accessed/modified by a user during runtime, or the like.

Controller 110 then utilizes a second machine learning model to determine whether or not this monitored performance indicates that software container 120 as quantified by runtime parameters matches runtime environment 130A. This second machine learning model may or may not include or reflect any static parameters. In some examples, the second machine learning model may include some static parameters, such as a size of software container 120. In other examples, the second machine learning model may include all static parameters as well as runtime parameters, and by finding correlations using the performance of software container 120 in an already assigned (by the first machine learning model) runtime environment 130A, controller 110 may improve an ability to quickly identify whether or not runtime environment 130A matches software container 120, and/or whether another of runtime environments 130 may better match software container 120.

Controller 110 may determine that one of runtime environments 130 matches software container 120 when a performance of software container 120 satisfies a threshold, and/or when a cost (e.g., a billable resource usage, such as a usage of memory or processing power) of software container 120 as executed within the assigned runtime environment 130 satisfies a threshold.

Controller 110 may continue to monitor software container 120 over time, gathering increased data on performance and/or on changing parameters. For example, controller 110 may determine that a processing usage and/or memory usage of software container 120 within runtime environment 130A spikes, such that a performance (and/or cost) fails a threshold. In response to this, controller 110 may analyze whether another of runtime environments 130 better matches software container 120, such that a performance (and/or cost) of runtime may satisfy the threshold when executed in this different runtime environment 130. If controller 110 determines that a different runtime environment runtime environment 130B will match the static and/or runtime parameters in this way, controller 110 may cause software container 120 to instead run in this different runtime environment 130B.

Controller 110 may continue to monitor software container 120 until ongoing updates fall below a threshold. This may include changes to static and/or runtime parameters falling below a threshold, such that a usage, cost, and/or performance of software container 120 within the assigned runtime environment 130 is identified as stable. This may also include any identified mismatches between software container 120 and runtime environment 130 being below a threshold (e.g., identifying that software container 120 is matched to runtime environment 130 with a 98% match may fail a threshold of needing continuing monitoring). When controller 110 determines that ongoing updates are minimal (such that software container 120 and runtime environment 130 are well matched as described above), controller 110 may terminate monitoring of software container 120 within runtime environment 130.

Controller 110 may independently update both the first and the second machine learning model. For example, controller 110 may update both with information on the final determined static and/or runtime parameters, the full historical performance of software container 120 in each assigned runtime environment 130, the full historical cost of software container 120 in each assigned runtime environment 130, or the like. Controller 110 may further separate out each model to distinguish between different classes, types, categories, or the like of software containers (such as software container 120). Over time, controller 110 may further determine what characteristics of software containers 120 hold true correlations that should dictate assignment to various runtime environments 130, and strengthen rules of the machine learning models to assign software containers 120 accordingly in the future. In this way, the monitored data of the performance and cost of software containers 120 in runtime environments 130 over time may become training data to determine how to improve at assigning software containers 120 in the future.

In some examples, runtime parameters as determined and monitored by controller 110 may include an impact of running software container 120 within the assigned runtime environment 130 on other to downstream processes. For example, controller 110 may determine that software container 120 is used for spooling print jobs, and another container is used for live audio processing for conference calls (e.g., these being categories of these containers). Controller 110 may further determine that, during operation, a process that includes software container 120 may not be substantially impacted if high CPU usage causes some slowdowns, while a process that receives the processed audio of the second container may be more substantially impacted by any latency or jitter introduced by computer processing contention. Upon determining this, controller 110 may determine that a performance threshold for software container 120 is different than a performance threshold for the second software container. In this way, controller 110 may improve not only the ability of software containers 120 to execute in a given runtime environment, but also improve the execution of a full computing process of which one part includes the runtime of software container 120 in the assigned runtime environment.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and other components within controller 110 (e.g., such as processor 220) to communicate with entities external to controller 110. Specifically, interface 210 may be configured to enable components of controller 110 to communicate with a computing device providing software container 120, one or more computing devices hosting runtime environments 130, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to use different machine learning models to assign software containers to runtime environments. Controller 110 may utilize processor 220 to thusly assign software containers. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to use the different machine learning models to learn different correlations to work together to initially and then iteratively assign software containers to runtime environments before and during runtime, respectively.

Processor 220 may assign software containers to runtime environments according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may assign software containers to runtime environments as described herein according to instructions 232 of one or more applications (e.g., software applications) stored in memory 230 of controller 110.

In addition to instructions 232, in some examples gathered/predetermined data or techniques or the like as used by processor 220 to assign software containers to runtime environments as described herein may be stored within memory 230. For example, memory 230 may include first model 234 (which may itself include static parameter data 236) and second model 238 (which may include static parameter data 240 and/or runtime parameter data 242). Though only two models 234, 238 are depicted in FIG. 2 for purposes of illustration, in other examples, each model 234, 238 may be used to themselves create a plurality of sub machine learning models that learn how different parameters of a software container indicate how the software container should be assigned to a runtime environment. For example, in practice controller 110 may monitor and capture the parameter data while software container 120 is running within the assigned runtime environment, and controller 110 may use machine learning techniques 246 such as those described below to determine associations between this metadata to define an input vector of a subsequent machine learning model. The size of an input layer may be defined by a dimension of the input vector, and associations may be classified by monitored performance within the runtime environment. This information may be used to create and train (and retrain) each model over time, weighting accordingly (e.g., removing older annotations, reinforcing newer ones, or the like).

Further, memory 230 may include threshold data 244. Threshold data 244 may indicate a point at which a performance and/or cost of a software container within a runtime environment indicates that the software container should be moved to a different runtime environment. Threshold data 244 may also include data on a point at which a match between a software container and a runtime environment is so good, and/or the performance and/or cost is so stable, that monitoring of the software container is to cease.

Memory 230 may further include machine learning techniques 246 that controller 110 may use to improve a process of determining parameters of software containers to assign these software containers to runtime environments as discussed herein over time. Machine learning techniques 244 can comprise algorithms or models that are generated by performing supervised, unsupervised, or semi-supervised training on a dataset, and subsequently applying the generated algorithm(s) or model(s) to assign software containers. Using these machine learning techniques 246, controller 110 may improve an ability of assigning software containers over time.

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 246 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
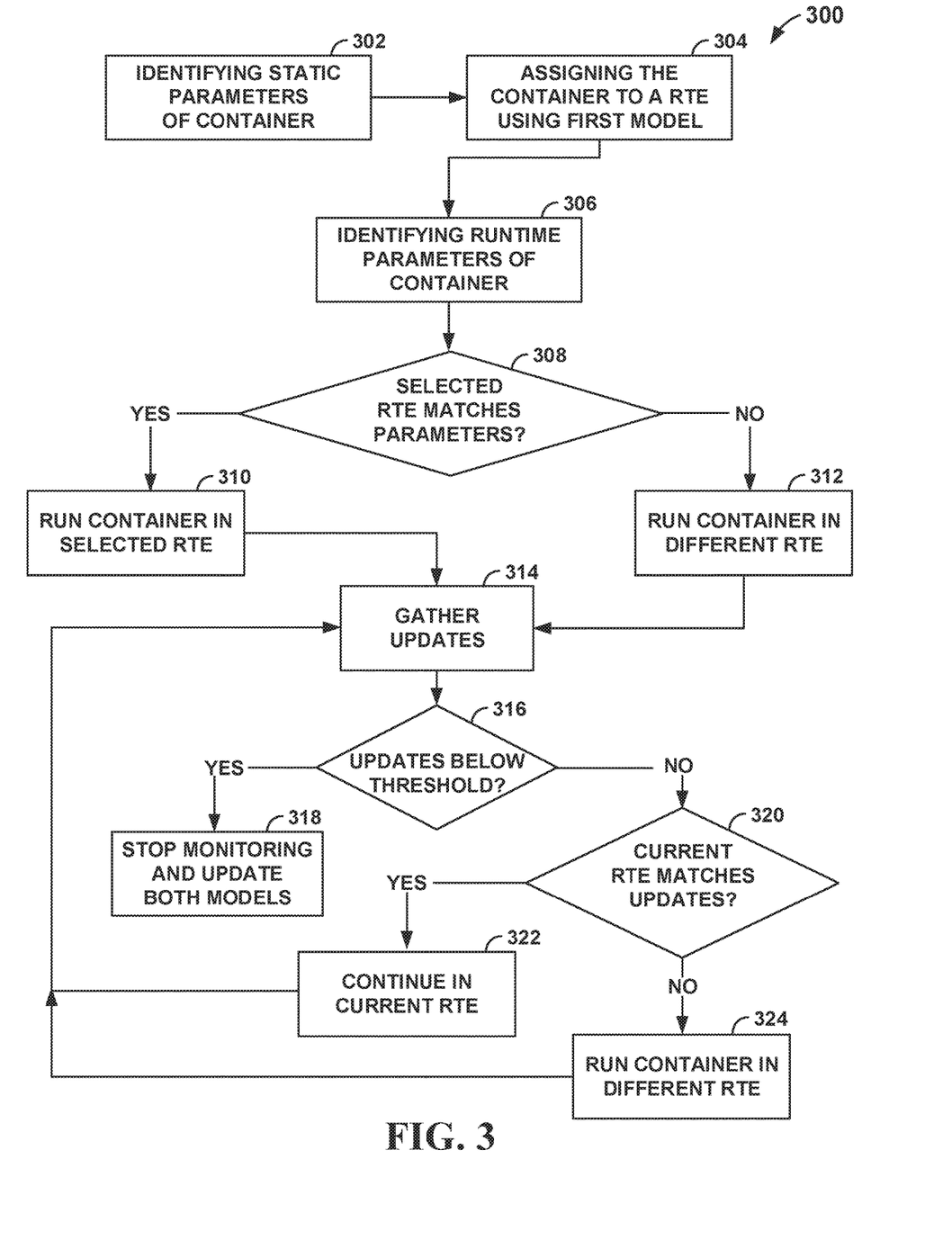
FIG. 3 depicts an example flowchart by which the controller of FIG. 1 may assign software containers to one of a plurality of runtime environments.

Using these components, controller 110 may assign software containers to runtime environments as discussed herein. For example, controller 110 may assign software containers according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Flowchart 300 may begin with controller 110 identifying static parameters of software container 120 (302). Controller 110 may use a first machine learning model to assign the software container 120 to runtime environment 130A (or RTE as provided in flowchart 300) (304). Controller may assign software container 120 to runtime environment 130A based on the identified static parameters.

Controller 110 may identify runtime parameters of software container 120 (306). Controller 110 may identify these runtime environments during runtime of software container 120 in runtime environment 130A. In some examples, controller 110 may gather a set of real time static parameters of software container 120, where these real time static parameters are an updated version of the preliminary static parameters identified by controller 110 (where the preliminary static parameters were those static parameters identified at step 302). Put differently, where static parameters are gathered by controller 110 both prior to runtime to identify an initial runtime environment 130 and then during runtime, a version of the static parameters that are gathered prior to runtime may be classified as preliminary static parameters and a (potentially, but not necessarily) different version of those static parameters gathered during runtime may be classified as real time static parameters.

Controller 110 may determine whether or not assigned runtime environment 130A matches the identified runtime parameters (308). Controller 110 may use a second machine learning model to determine if the assigned runtime environment 130A matches the identified runtime parameters. In some examples, controller 110 may use the model to determine if both the runtime parameters and the real time static parameters match the assigned runtime environment 130A. Controller 110 may determine that runtime parameters and/or real time static parameters of software container 120 match the assigned runtime environment 130A when a performance and/or cost of software container 120 within the assigned runtime environment 130A satisfy one or more thresholds (e.g., having a performance above a threshold, and having a cost below a threshold).

If controller 110 determines that the model indicates that one (or both) of the parameters match the assigned runtime environment 130A, controller 110 may continue to run software container 120 in selected runtime environment 130A (310). Alternatively, if controller 110 determines that there is not a match as discussed herein, controller 110 may move software container 120 to a different runtime environment 130B that is determined to have an improved match with the parameters using the second model (312). Similarly, if controller 110 determines that there is not a match as discussed herein, but that the match score is better between software container 120 and the assigned runtime environment 130A than between other runtime environments 130, then controller 110 may determine to keep software container 120 in assigned runtime environment 130A until one or more improved runtime environments 130 is found, brought online, created, or the like.

In either way, controller 110 may gather updates over time (314). Controller 110 may gather these updates on a predetermined schedule (e.g., once every 20 minutes, or once every number of actions, or the like). These updates may be updates/changes to the parameters, performance updates, cost updates, or the like. Controller 110 may then determine whether or not these updates are below a threshold (316). For example, the threshold may include a threshold quantity of changes, or a threshold severity of changes, such that either a full and final set of parameters or a full and final performance of software container 120 is not yet known. If the updates are less severe and/or less numerous than a threshold (such that software container 120 matches whichever of runtime environments 130 that software container 120 is currently assigned to), controller 110 determines that software container 120 matches whichever of runtime environments 130 that software container 120 is currently running in in a stable manner, and determines to terminate subsequent analyses of software container 120 during runtime (e.g., as according to the predetermined schedule) (318). As part of stopping monitoring, controller 110 may also update both (or all, where there are more than two) machine learning models with final parameter readings, performance data, cost data, and the like.

Alternatively, if controller 110 determines that the updates are of a severity and/or number that is above a threshold (indicating that the match is still not satisfactory, and/or the parameters and/or performance still seem to be in flux), controller 110 may analyze whether the current runtime environment 130 matches software container 120, and/or whether other runtime environments 130 better match software container 120 according to the second model (320). If the current runtime environment 130 matches software container 120 as well as other runtime environments 130, controller 110 continues to run software container 120 in the current software environment 130 (322).

In some examples, controller 110 may determine that another runtime environment 130 is better suited for software container 120. In this example, controller 110 migrates software container 120 to this other runtime environment 130, and causes software container 120 to run in this different runtime environment 130 (324). Whether or not controller 110 continues to run software container 120 in current runtime environment 130, controller 110 continues to gather parameter updates (e.g., at 314 according to the predetermined schedule) and determine whether or not another runtime environment 130 has a better match for software container 120 (at 320) until controller determines that the severity and/or number of gathered updates are below a threshold (at 316).

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
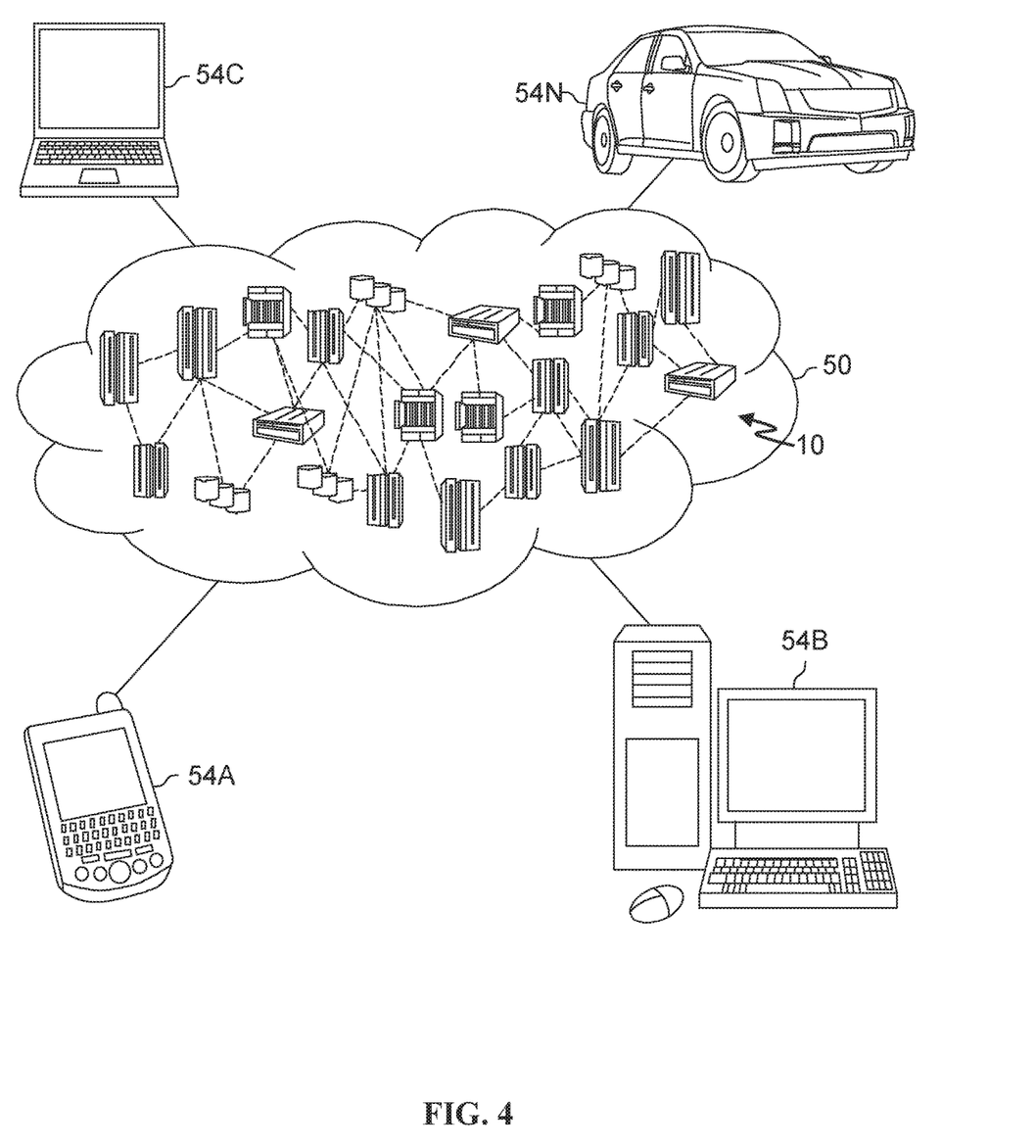
FIG. 4 is a schematic diagram of a cloud computing environment in which playback speeds may be identified.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 may communicate with any type of computerized device over any type of network and/or network addressable connection (e.g., using a web browser).

Figure 5:
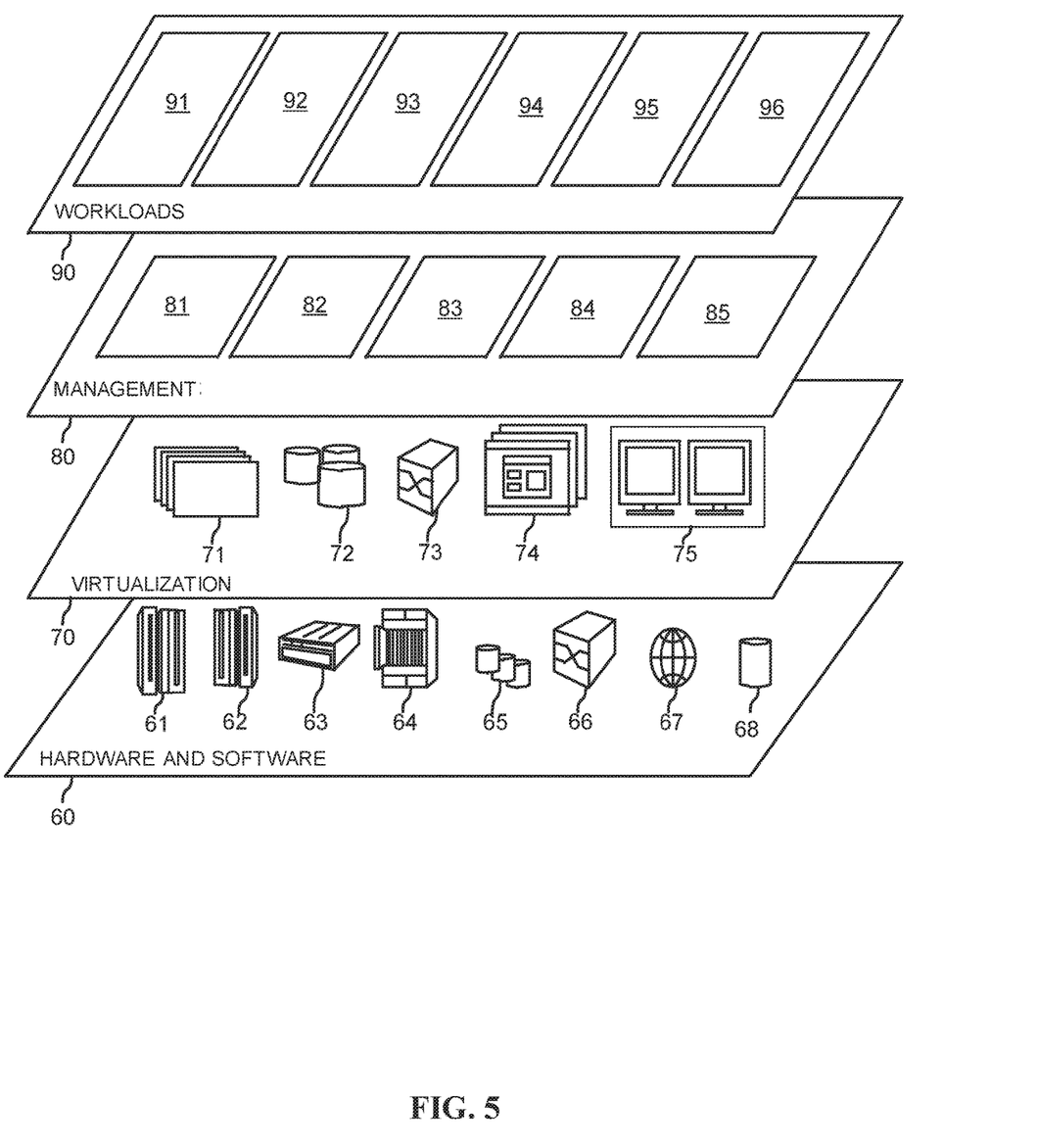
FIG. 5 is a diagram of abstraction model layers of a cloud computing environment in which playback speeds may be identified.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and runtime environment determination for software containers 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying static parameters of a software container, wherein the static parameters relate to metadata of the software container itself;
   assigning the software container to a selected runtime environment based on the static parameters using a first machine learning model;
   identifying runtime parameters for the software container by analyzing the software container at runtime, where the runtime parameters relate to operations required during runtime by the software container;
   using a second machine learning model, in response to a determination that the selected runtime environment matches the runtime parameters, and continuing to run the software container in the selected runtime environment;
   using the second machine learning model, in response to a second determination that the selected runtime environment does not match the runtime parameters, running the software container in a different runtime environment that matches both the static and runtime parameters;
   gathering, on a predetermined schedule, characteristics of the software container with correlations that dictate performance changes in the different runtime environment; wherein the characteristics include stability of the different runtime environments and latency for each runtime environment introduced by a computer processing contention;
   generating training data based on the correlations between the characteristics and the performance changes in the different runtime environment; and
   retraining the second machine learning model based on the training data.

2. The computer-implemented method of claim 1, further comprising:
   monitoring a performance of the software container during runtime;
   updating the first machine learning model based on the performance; and
   updating the second machine learning model based on the performance.

3. The computer-implemented method of claim 2, wherein the performance is monitored for at least central processing unit (CPU) usage, memory usage, and input/output (I/O) metrics.

4. The computer-implemented method of claim 1, wherein the static parameters are preliminary static parameters, the computer-implemented method further comprising:
   identifying real time static parameters for the software container by analyzing the software container at runtime;
   in response to determining, using the second machine learning model, that the selected runtime environment matches both the real time static parameters and the runtime parameters, continuing to run the software container in the selected runtime environment; and
   in response to determining, using the second machine learning model, that the selected runtime environment does not match the real time static parameters and the runtime parameters, running the software container in the different runtime environment that matches both the real time parameters and the runtime parameters.

5. The computer-implemented method of claim 4, further comprising:
   identifying, subsequent to the identifying the runtime parameters according to a predetermined schedule, one or more updates for either the real time static parameters or the runtime parameters by analyzing the software container during the runtime;
   in response to determining, using the second machine learning model, that the selected runtime environment still matches both the real time static parameters and the runtime parameters with the updates, running the software container in the selected runtime environment; and
   in response to determining, using the second machine learning model, that the selected runtime environment does not match the real time static parameters and the runtime parameters with the updates, running the software container in the different runtime environment.

6. The computer-implemented method of claim 5, further comprising terminating subsequent analyses of the software container during the runtime according to the predetermined schedule in response to determining that a quantity or severity of the one or more updates are lower than a threshold.

7. The computer-implemented method of claim 1, wherein the runtime parameters include a computing process of which the software container is one part.

8. The computer-implemented method of claim 1, wherein the static parameters include:
   a type of software container;
   a template of the software container; and
   a category of the software container.

9. The computer-implemented method of claim 1, wherein the runtime parameters include:
   a number of load balancing operations per hour;
   a number of automated rollbacks;
   a number of automatic bin packing operations per hour; and
   a number of self-healing actions per hour.

10. A system comprising:
   a processor; and
   a memory in communication with the processor, the memory containing instructions that, when executed by the processor, cause the processor to:
      identify static parameters of a software container, wherein the static parameters relate to metadata of the software container itself;
      assign the software container to a selected runtime environment based on the static parameters using a first machine learning model;
      identify runtime parameters for the software container by analyzing the software container at runtime, where the runtime parameters relate to operations required during runtime by the software container;
      using a second machine learning model, in response to a determination that the selected runtime environment matches the runtime parameters, continuing to running the software container in the selected runtime environment;
      using the second machine learning model, in response to a second determination that the selected runtime environment does not match the runtime parameter, running the software container in a different runtime environment that matches both the static and runtime parameters;
      gathering, on a predetermined schedule, characteristics of the software container with correlations that dictate performance changes in the different runtime environment; wherein the characteristics include stability of the runtime environments and latency for each runtime environment introduced by a computer processing contention;
      generating training data based on the correlations between the characteristics and the performance changes in the different runtime environment; and
      retraining the second machine learning model based on the training data.

11. The system of claim 10, the memory containing additional instructions that, when executed by the processor, cause the processor to:
   monitor a performance of the software container during runtime;
   update the first machine learning model based on the performance; and
   update the second machine learning model based on the performance.

12. The system of claim 11, wherein the performance is monitored for at least central processing unit (CPU) usage, memory usage, and input/output (I/O) metrics.

13. The system of claim 10, wherein the static parameters are preliminary static parameters, the memory containing additional instructions that, when executed by the processor, cause the processor to:
   identify real time static parameters for the software container by analyzing the software container at runtime;
   using the second machine learning model, in response to a third determination that the selected runtime environment matches both the real time static parameters and the runtime parameters, continuing to run the software container in the selected runtime environment; and
   using the second machine learning model, in response to a forth determination that the selected runtime environment does not match the real time static parameters and the runtime parameters, running the software container in the different runtime environment that matches both the real time parameters and the runtime parameters.

14. The system of claim 13, the memory containing additional instructions that, when executed by the processor, cause the processor to:
   identify, subsequent to the identifying the runtime parameters according to a predetermined schedule, one or more updates for either the real time static parameters or the runtime parameters by analyzing the software container during the runtime;
   in response to determining, using the second machine learning model, that the selected runtime environment still matches both the real time static parameters and the runtime parameters with the updates, running the software container in the selected runtime environment; and
   in response to determining, using the second machine learning model, that the selected runtime environment does not match the real time static parameters and the runtime parameters with the updates, running the software container in the different runtime environment.

15. The system of claim 14, the memory containing additional instructions that, when executed by the processor, cause the processor to terminate subsequent analyses of the software container during the runtime according to the predetermined schedule in response to determining that a quantity or severity of the one or more updates are lower than a threshold.

16. A computer program product, the computer program product comprising a computer readable storage medium having program instructions embodied therewith, the program instructions executable by a computer to cause the computer to:
   identify static parameters of a runtime environment for a software container, wherein the static parameters relate to metadata of the software container itself;
   assign the software container to a selected runtime environment based on the static parameters using a first machine learning model;
   identify runtime parameters for the software container by analyzing the software container at runtime, where the runtime parameters relate to operations required during runtime by the software container;
   using a second machine learning model, in response to a determination that the selected runtime environment matches the runtime parameters, continuing to run the software container in the selected runtime environment;

using the second machine learning model, in response to a second determination that the selected runtime environment does not match the runtime parameter, running the software container in a different runtime environment that matches both the static and runtime parameters;

gathering, on a predetermined schedule, characteristics of the software container with correlations that dictate performance changes in the different runtime environment; wherein the characteristics include stability of the different runtime environments and latency for each runtime environment introduced by a computer processing contention;

generating training data based on the correlations between the characteristics and the performance changes in the different runtime environment; and retraining the second machine learning model based on the training data.

17. The computer program product of claim 16, the computer readable storage medium containing additional program instructions that, when executed by the computer, cause the computer to:

monitor a performance of the software container during runtime;

update the first machine learning model based on the performance; and update the second machine learning model based on the performance.

18. The computer program product of claim 17, wherein the performance is monitored for at least central processing unit (CPU) usage, memory usage, and input/output (I/O) metrics.

19. The computer program product of claim 16, wherein the static parameters are preliminary static parameters, the computer readable storage medium containing additional program instructions that, when executed by the computer, cause the computer to:

identify real time static parameters for the software container by analyzing the software container prior to the runtime;

in response to determining, using the second machine learning model, that the selected runtime environment matches both the real time static parameters and the runtime parameters, continuing to run the software container in the selected runtime environment; and in response to determining, using the second machine learning model, that the selected runtime environment does not match the real time static parameters and the runtime parameters, running the software container in the different runtime environment.

20. The computer program product of claim 19, the computer readable storage medium containing additional program instructions that, when executed by the computer, cause the computer to:

identify, subsequent to the identifying the runtime parameters and according to a predetermined schedule, one or more updates for either the real time static parameters or the runtime parameters by analyzing the software container during the runtime;

in response to determining, using the second machine learning model, that the selected runtime environment still matches both the real time static parameters and the runtime parameters with the updates, continuing to run the software container in the selected runtime environment; and in response to determining, using the second machine learning model, that the selected runtime environment does not match the real time static parameters and the runtime parameters with the updates, running the software container in the different runtime environment.

* * * * *